(12) United States Patent
Shvarev et al.

(10) Patent No.: US 6,391,185 B1
(45) Date of Patent: May 21, 2002

(54) COMPOSITE REGENERABLE ADSORPTION CARBON MATERIAL AND ITS REGENERATION METHOD

(75) Inventors: Alexey E. Shvarev; Alexander V. Pimenov; Alexander G. Mitilineos, all of St. Petersburg (RU); Joseph L. Shmidt, New York, NY (US)

(73) Assignee: Electrophor, Inc., Dobbs Ferry, NY (US)

( * ) Notice: Subject to any disclaimer, the term of this patent is extended or adjusted under 35 U.S.C. 154(b) by 0 days.

(21) Appl. No.: 09/667,846

(22) Filed: Sep. 22, 2000

(30) Foreign Application Priority Data

Jan. 5, 2000 (RU) ............................................. 00100295

(51) Int. Cl.[7] ................................................. C25F 1/00
(52) U.S. Cl. ....................................... 205/687; 205/768
(58) Field of Search ................................. 205/687, 768

(56) References Cited

U.S. PATENT DOCUMENTS 4,217,191 A * 8/1980 Doniat et al. ............... 204/130
4,261,857 A * 4/1981 Nakao ......................... 252/420

* cited by examiner

*Primary Examiner*—Arun S. Phasge
(74) *Attorney, Agent, or Firm*—Ronald S. Cornell

(57) ABSTRACT

The present process provides improved means for adsorbing components and for regeneration of a composite adsorption carbon material (CRAC) used for effecting the desired separation using an electrochemical process under conditions wherein the specific volumetric electric conductivity of the CRAC differs from that of the electrolyte employed by not more than one order of magnitude, a specific current density of at least 0.01 ampere per gram of CRAC is employed, and a high degree of regeneration of CRAC from polar and non-polar substances and heavy metal ions is obtained, as well as improved adsorption.

11 Claims, 4 Drawing Sheets

COMPOSITE REGENERABLE ADSORPTION CARBON MATERIAL AND ITS REGENERATION METHOD

The present invention is related to the electrochemical regeneration of composite activated carbon materials and the separation of adsorbed organic compounds and heavy metals there from. The overall process can be used for purification of liquid and gaseous media.

BACKGROUND OF THE INVENTION

Activated carbon adsorbent is widely used for purification of liquid and gaseous media from organic matter. Typically, activated carbon adsorbent is used in the so-called percolation method, where liquid or gas containing organic compounds is pumped through the column containing the adsorbent.

After the activated carbon is saturated with the organic compounds, the saturated activated carbon adsorbent is either replaced with the new one (and the old adsorbent is discarded or burned) or regenerated for reuse by heating it with or without steam to high temperature (typically from 300 to 600 degrees C), whereby the adsorbed organic compounds are vaporized/destroyed. Thermal regeneration of the activated carbon adsorbents requires large energy expenditures, degradation (to 5–10%) of the activated surface during each regeneration and expensive high temperature equipment. Either chemical or electrochemical regeneration can also be used. Chemical regeneration of the activated carbon adsorbents causes degradation and blockage of the activated carbon to 10–15%.

There are known methods of electrochemical regeneration (desorption) of the activated carbon adsorbents, mainly activated carbons in granular or powdered form. U.S. Pat. No. 3,730,885 (issued May 1, 1973) describes a method of electrochemical regeneration of the activated carbon by creating a potential differential between the surface of the activated carbon adsorbent saturated with organic compounds and the desorbing solution. It describes the desorption of the described compounds from the surface of the activated carbon material by the way of polarizing activated carbon to −1 volt (in reference to a saturated calomel electrode). Solutions for desorption were $10^{-2}$ M $Na_2SO_4$ and $0.7 \cdot 10^{-2}$ NaCl. Powdered activated carbon (an average particle size was 0.044 mm) in a mixture with Teflon dispersion (fluoroplastics) (17:3 ratio) was used as activated carbon material. U.S. Pat. No. 3,730,885 describes using currents up to 1 milliampere per gram of the activated carbon at the potential of up to 1 volt. This patent shows that changing polarity of the activated carbon material causes the desorption of strongly polarized organics—acetic acid (initial adsorption capacity of the activated carbon material) during an hour at a current of less than 1 milliampere per gram of adsorbent. The attempts to desorb the adsorbed weakly polarized organic compound (amyl alcohol) resulted in that only half of the adsorbed amyl alcohol was desorbed into solution. The degree of desorption of the organic compounds adsorbed from municipal wastewater by changing polarity within the limits of 1 volt was equal to 30% (19 mg per gram of the activated carbon adsorbent was desorbed from 60 mg per gram adsorbed initially) (prototype). Thus the system of U.S. Pat. No. 3,730,885 is relatively ineffective is desorbing weekly adsorbed organic compounds.

U.S. Pat. No. 5,904,832 (issued May 18, 1999) and publications by I. V. Sheveleva et al. ("Relationship between electrochemical and adsorption properties of the hydrate cellulose and polyacrylonitrile based carbon fibers" Chemistry and Technology of Water, V. 12, 7, 613–616, 1990; "Adsorption of phenol from water solutions by carbon fibrous electrodes", Journal of Physical Chemistry, V.64, 1, 166–169, 1990) also describe regeneration of activated carbon material that has adsorbed thereon polar/ionic organic compounds. The regeneration is done by contacting this activated carbon material with electrolyte solution, creating an electrical polarization potential on the carbon at the boundary of the carbon material and the electrolyte solution, followed by regeneration of this activated carbon material. The adsorbed organic compounds are thus transferred from the carbon adsorbent into the electrolyte solution due to their charge, and movement in the electric field. In the above publications I. V. Sheveleva describes the regeneration of the activated carbon fibers with phenol adsorbed thereon by contacting activated carbon fibers with 1 N potassium sulfate solution (pH 12) and by creating a potential from −0.7 to −1.3 volt.

U.S. Pat. No. 5,904,832 describes the regeneration of activated carbon adsorbent with the simultaneous destruction of the desorbed organic compounds. It was possible to regenerate activated carbon adsorbent while desorbing the adsorbed phenol removed from a waste stream. A negative potential is applied to the activated carbon adsorbent. Any type of activated carbon may be employed. The electrolyte concentration for desorption is chosen so as to avoid excessively high voltage (too much heat generation). The carbon column in U.S. Pat. No. 5,904,832 comprises metal screens inside carbon electrodes for distributing electric current inside the column. In experiments (1–16) of U.S. Pat. No. 5,904,832 by Clifford there was achieved regeneration from 30% to 80% of the phenol adsorption capacity by using currents of up to 5–10 milliamperes per gram of activated carbon adsorbent. The time of regeneration was from two hours for regeneration of less than 50% to 45 hours for 80% regeneration.

The aforesaid prior art systems displace the adsorption equilibrium by polarizing the boundary between carbon adsorbent—solution. In this case the drop of the potential at the cell is several volts (mostly, less than a volt), the currents—from 1 to 10 milliamperes per gram of adsorbent. It is only possible to shift the equilibrium significantly by means of polarization for compounds that are ionic form in one or another range of pH: phenols, sulfosalicilic acid, organic bases. This is the reason why all examples in these reference descriptions are based on these compounds.

The above described methods of regenerating carbon adsorbents with the organic matter adsorbed thereon by polarization have not been commercialized due to a number of drawbacks:

relatively efficient regeneration (over 50%) of the adsorbed organic matter was achieved only for ionic (strongly polarized) organic pollutants (acetic acid, phenol). Regeneration took place due to electrostatic (ionic) repulsion of the charged organic molecules from the same charged surface of the activated carbon adsorbent (electrode).

at these conditions only 50–90% regeneration for phenol was achieved.

regeneration required a long time (from several to 45 hours).

THE PRESENT INVENTION

The present invention teaches a new improved electrochemical process for desorbing adsorbed materials (nonpolar and polar organic compounds and heavy metal ions) from carbon adsorbents. The time for regeneration is decreased, and the degree of regeneration increased. Multiple regenerations may be employed.

For achieving a high degree regeneration and adsorption it is necessary that:

The composite adsorption regenerable carbon material (CRAC) has sufficiently high electric conductivity for uniform potential distribution—a volumetric electric conductivity of 1–100 $(Ohm.m)^{-1}$ The adsorbent (CRAC) specific volumetric electric must differ from the specific electric conductivity of electrolyte which fills up the pores of the adsorbent by not more than an order of magnitude (if the specific electric conductivity of the adsorbent (CRAC) is much higher, the current will flow preferably through the adsorbent, and if the specific electric conductivity of the electrolyte is much higher, the current will flow through the electrolyte), The specific current density has to be at least 0.01 ampere per gram of CRAC (so as to provide a uniform current flow through the surface of the adsorbent-electrolyte solution interface). When there is such high current flow, the surface of the adsorbent becomes highly hydrophilic due to the discharges of the ionic particles taking place at the adsorbent's surface. As a result the affinity of the surface towards organic (including nonionic, for example, chloroform) compounds becomes sharply lower, leading to their desorption, The adsorbing particles should preferably have large outer surface and large, developed macro- and microporous adsorption surface, due to their small diameter (less than 30 micron) and large adsorption surface area (over 500 $m^2$ per gram as per nitrogen). As a result, the material has large share of the adsorptional centers at the surface which are subject to the direct influence of the electric current, and, also, quick diffusion of the desorbed matter into solution. The porous matrix should preferably have a specific volumetric electric conductivity of 1–100 $(ohm.m)^{-1}$.

Preferably the composite regenerable adsorption carbon material comprises (as the activated carbon particles of the porous matrix) activated carbon fibers at least 1 mm long, 1 to 30 micron in diameter, with a methylene blue adsorption capacity of at least 200 mg per gram and the adsorption surface area of at least 500 $m^2$ per gram. The composite regenerable adsorption carbon material comprises carbon fibers at least 2 mm long, 1 to 30 micron in diameter. As the ion-exchange material it comprises ion-exchange fibers 1 to 30 microns in diameter with the exchange capacity at least 1 meq per gram or ion-exchange resins.

As the regeneration method the electric current may be passed through the porous matrix at a specific density preferably of at least 0.05 ampere per gram of the composite adsorption carbon material. The adsorbent layer is filled with the electrolyte water solution periodically during regeneration or after regeneration or continuously during regeneration. The adsorbed thereon compounds comprising organic compounds, including nonpolar, polar, ionic, biological, including bacteria, and heavy metal ions. The electric current may be applied in at least two stages with the polarity change, by passing through cathode or anode current.

Experimentally obtained linear relationship of the amount of the washed off (desorbed) matter and time at the constant electrolysis current, or linear dependence on the amount of electricity (FIG. 1) confirms the role of the current transfer through the interface boundary for desorbing organic compounds and heavy metals as compared to the prototype where the surface polarization takes place.

In contrast to U.S. Pat. No. 3,730,885) where forms a specific medium (acidic) for transferring species into the ionic forms for desorption, in the present invention desorption takes place due to the passage of the electric current, which affects all adsorbed particles including nonpolar ones.

The claimed method can be applied for the regeneration of the composite adsorption carbon material not only from the ionic, but also from polar and nonpolar organic substances (benzene, chloroform) as well as heavy metals.

Materials, well known for purification from organic compounds and heavy metals, were used for the composite regenerable adsorption carbon material, which forms the electrode.

Activated carbon fibers, manufactured by Aquaphor Corp., St.Petersburg, Russia, were at least 1 mm long, 1 to 30 micron in diameter, with the adsorption capacity for methylene blue at least 200 mg/g, and the adsorption surface area at least 500 $m^2/g$. Activated carbon fibers were obtained by pyrolysis and carbonization of viscose fibers (U.S. Pat. No. 5,521,008) followed by steam activation. Depending on conditions of carbonization and activation there may be obtained activated carbon fibers with different specific electric conductivities in the layer within the limits from 1 to 100 $(Ohm.m)^{-1}$.

Nonactivated carbon fibers at least 2 mm long and 1 to 30 micron in diameter were obtained by pyrolysis and carbonization with the final carbonization temperature more than 800° C. Specific electric conductivity of a layer of carbon fibers is ~100 $(Ohm.m)^{-1}$.

Ion-exchange materials in a form of fibers of 1 to 30 micron in diameter were obtained by partial hydrolisis of polyacrylonitrile fibers in presence of the binding agent, so that the exchange capacity was at least 1 meq/g and used as granulated ion-exchange material was e.g. sulphocationite C240NS produced by Sybron Chemicals Inc, USA.

Granulated activated carbon is porous carbon particles of variable size of granules manufactured by Barnebey & Sutcliffe Corp.

The composite regenerable adsorption carbon (CRAC) material by the claimed invention was obtained by mechanical mixing of components.

Additionally, it may be obtained by manufacturing a porous matrix containing activated carbon particles with polymeric binding and its subsequent carbonization, so that it attains the desired specific volumetric electric conductivity.

Water solutions of sodium sulphate, sodium carbonate and sodium chloride may be used as electrolytes in the electrochemical cell of the present invention. The electrolytes were selected by the specific volumetric electric conductivity as compared with that of their composite activated carbon material.

The second electrode is made as inert electrode of graphite (e.g. in form of a graphite rod).

Used in the electrochemical cell design were materials inert to adsorbed substances.

The composite adsorption carbon material may be regenerated both at least in one electrochemical cell or in several cells engaged in parallel, whereby the regeneration in one cell may proceed irrespectively of other electrochemical cells.

DETAILED DESCRIPTION OF THE INVENTION

In the course of regeneration by the present method pH may change due to the passage of electric current depending on the type of electrolyte used. The quick neutralization of changing pH may be achieved by changing the polarity of electrodes and passing the reverse current once or more in the course of regeneration or thereafter.

This invention provides simultaneous and uniform progress of the regeneration process in the entire volume of adsorbent. It allows use of electrochemical cells with volumetric layers of CRAC similar to adsorption columns used in industrial systems requiring longer path of the liquid undergoing filtration.

The specific volumetric electric conductivity of CRAC had been determined as follows by the methods disclosed in Robinson R., Stokes R.//Electrolyte solutions, translated from English, Moscow, 1963. CRAC was put into a glass column of 10 mm internal diameter and 300 mm long. Pressed to CRAC on both sides of the column were flat graphite electrodes 9.5 mm in diameter. Connected to the electrodes were E8-2 type alternating current bridge terminals (Arsenal Corp., St.Petersburg, Russia). The resistance of material was measured at 1 KHz frequency alternating current. The specific volumetric electric conductivity of the material was calculated by formula:

$$\delta_x = \frac{1}{R} \cdot \frac{\lambda}{S}$$

where:

$\delta_x$ specific volumetric electric conductivity of material X, $(Ohm.m)^{-1}$, R measured value of material resistance in column, Ohm, S column area, $m^2$, l column length, m.

The electrolyte solution specific volumetric electric conductivity values are given in the reference book for chemists edited by B. P. Nikolsky, vol. 3, "Chemistry", Leningrad, 1965.

Figure 1:
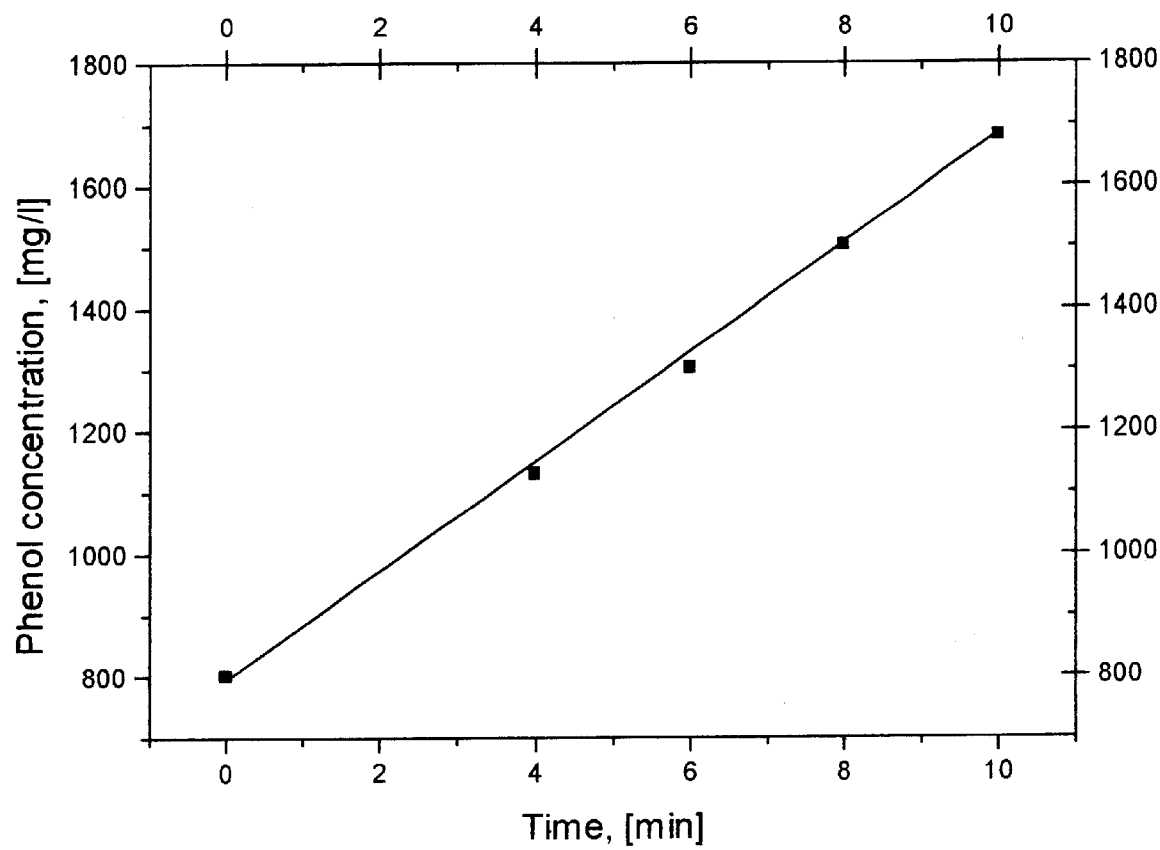
FIG. 1 depicts desorbed matter to time at constant electrolysis current.
Figure 2:
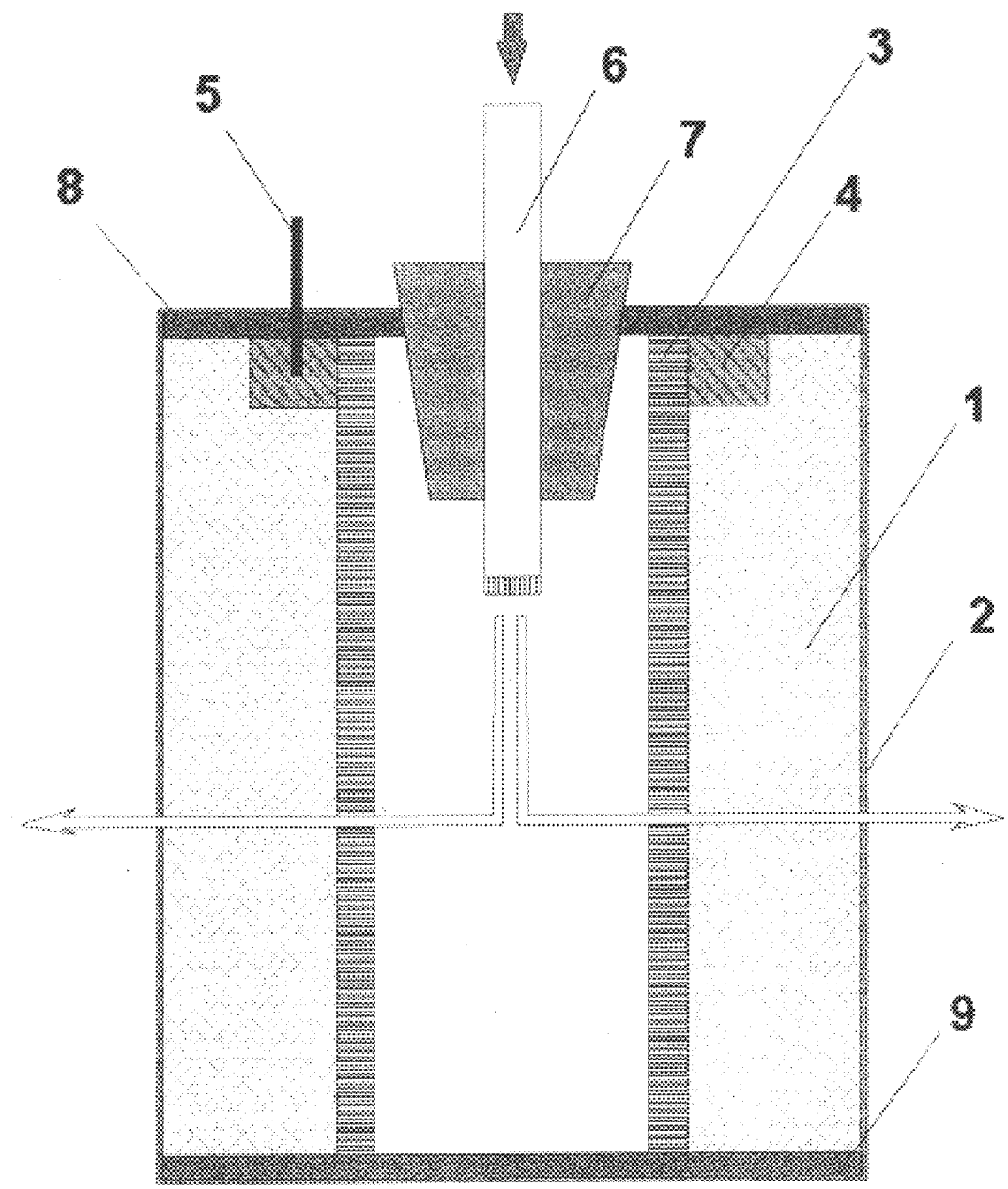
FIG. 2 shows a regenerable adsorption electrode for the practice of the present invention.

The process of adsorption of organic matter and heavy metals was implemented as follows: CRAC of 0.5–1 g mass was placed into the regenerable adsorption electrode, the design of which is shown in FIG. 2. The regenerable adsorption electrode is designed to carry out the successive adsorption & regeneration cycles by passing the electric current and is a structure comprising the composite regenerable activated carbon material 1, the polymeric net 2, the porous polyethylene element 3, the graphite ring 4 providing reliable electric contact with the adsorbent due to the resilience of the latter, the contact 5, the inlet branch pipe 6, the plug 7 and the top 8 and bottom 9 parts of the body.

Figure 3:
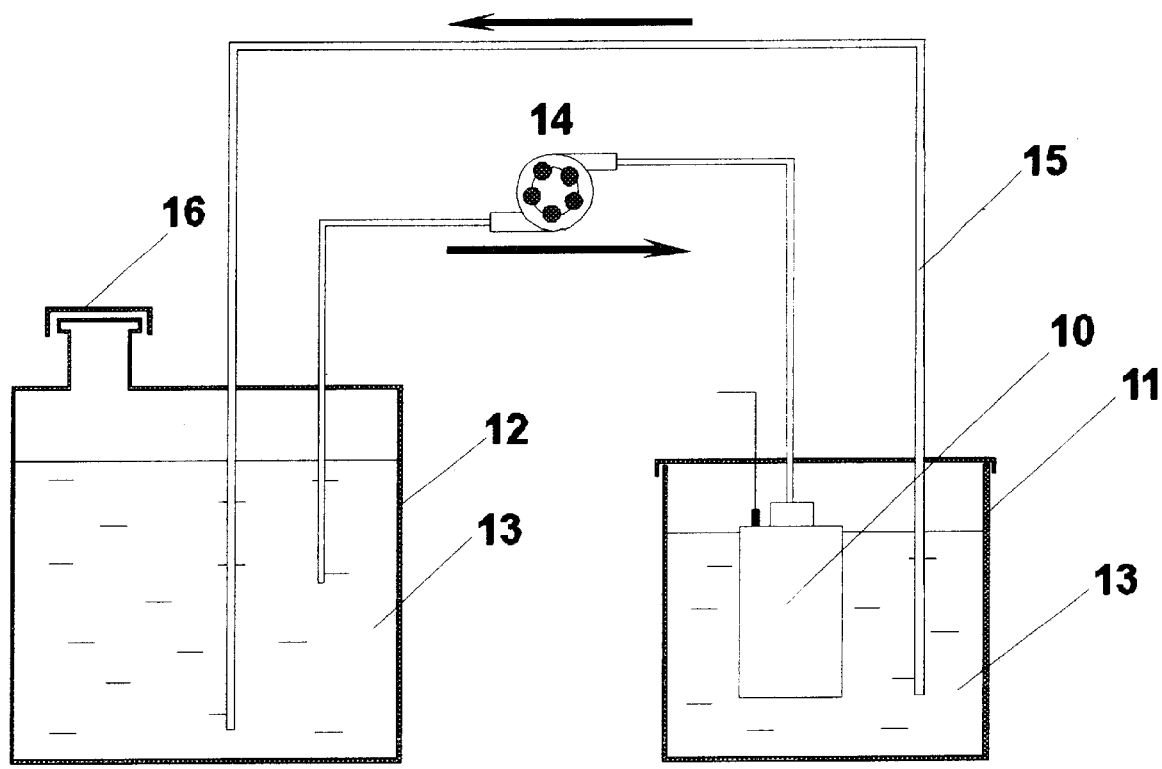
FIG. 3 shows a system for adsorbing organic and heavy metals.

To adsorb organic matter and heavy metals the design of FIG. 3 was used.

This unit comprises the regenerable adsorption electrode 10, the capacity for solution under purification 11, the expanding capacity for solution 12, the solution 13, the peristaltic pump for solution transfer pumping 14, the communications 15, and rubber plug 16.

The initial water solution of organic matter and heavy metals in an amount of 500 ml was pumped through CRAC by the peristaltic pump at □50 $cm^3$/min flow rate. This solution was periodically syringe sampled in 0.5 ml samples to find the concentration of the adsorbed substance. The process was continued until the concentration of organic matter and heavy metals decreased. On the attainment of the steady state condition the adsorption was terminated.

The method of finding the mass content of adsorbed substances was as follows:

Phenol and hydroquinone were found photometrically by spectrophotometer C*-46 (LOMO Corp., St.Petersburg, Russia), 210 nm wavelength, 10 mm vessel. Measurement range was 0.1–100 mg/$dm^3$. Methylene blue was found photometrically by colorimeter K*K-3 (LOMO Corp., St.Petersburg, Russia), 400 nm wavelength, 10 mm vessel. Measurement range was 2–100 mg/$dm^3$. Benzene and chloroform were found by the gas & liquid chromatography method involving the use of Hewlett-Packard-5730A instrument, Sorbent POLYSORB, temperature of column 150□C, vaporizer 200□C, detector 250□C. Measurement range was 0.5–100 mg/$dm^3$. To inject the sample a 1□l syringe was used. Bivalent copper ions were found photometrically by colorimeter K*K-3 (LOMO Corp., St.Petersburg, Russia) by way of photometric assessment of diethyldithiocarbamate complex of bivalent copper at 400 nm wavelength, 10 mm vessel. The measurement range was 1–50 □g/$dm^3$. The methods are given in [Lurye Yu.Yu// Analytical chemistry of industrial waste water, M, Chemistry, 1984]. The initial adsorption capacity was calculated by the adsorbed substance using formula:

$$\tilde{A}_x = \frac{V_{solution} \cdot (C_1 - C_2)}{m_{adsorbent}}$$

where:

$\tilde{A}_x$—adsorption capacity by substance X, mg/g (for copper ions—mmole/g), $V_{solution}$—volume of solution pumped through, $cm^3$, $m_{adsorbent}$—mass of adsorption active component of CRAC, g.

$C_1$—initial concentration of X in solution, mg/$dm^3$, $C_2$—final concentration of X in solution, mg/$dm^3$.

Figure 4:
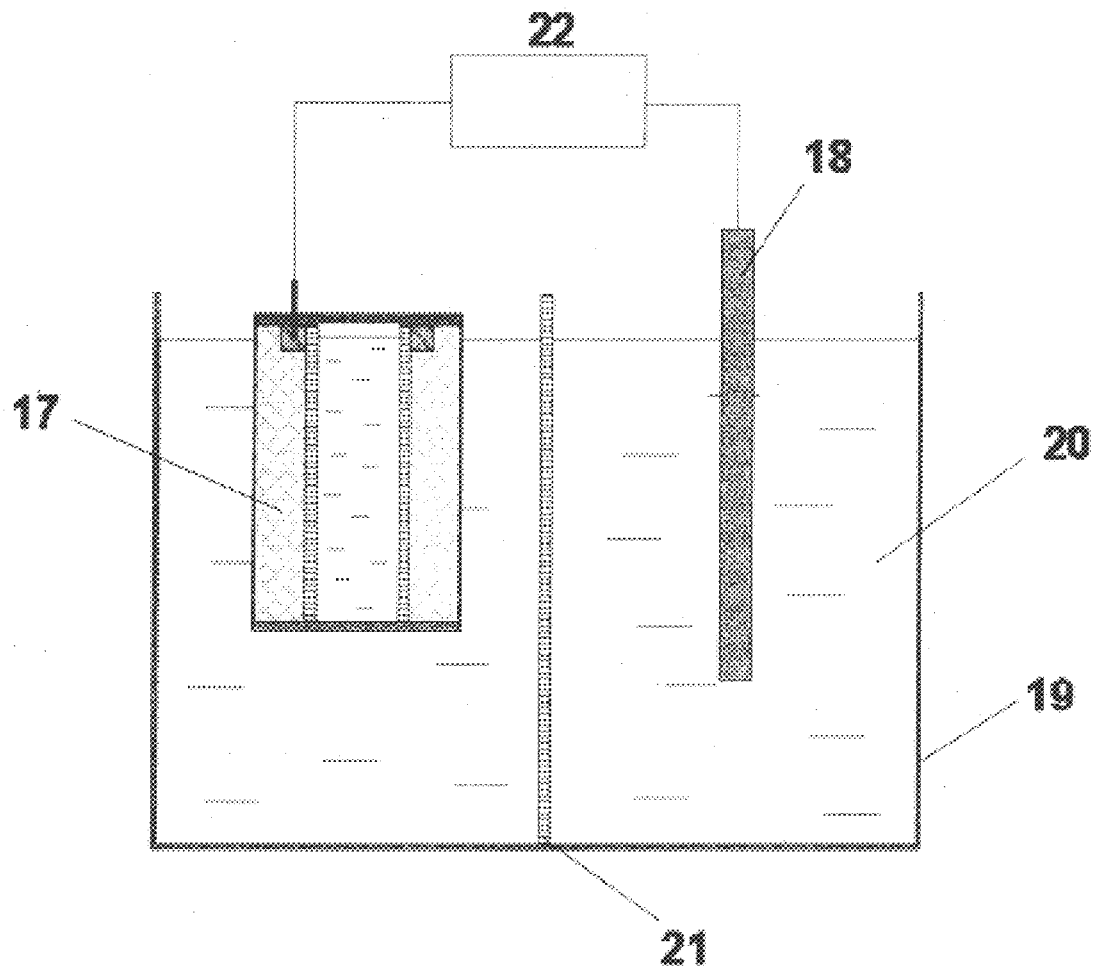
FIG. 4 illustrates an electrochemical cell for carrying out regeneration.

The electrode with CRAC was transferred to a 200 ml electrochemical cell of the design shown in FIG. 4. The cell for the regeneration cycle implementation consists of the regenerable adsorption electrode 17, the inert electrode 18, the cell body 19, the electrolyte solution 20, the diaphragm 21, and the electric current source 22. The inert electrode is a graphite rod 6 mm in diameter and 80 mm long. The cell was filled with the electrolyte solution.

The regeneration was carried out by passing through the cell the direct current of specific density of at least 0.01 A per 1 gram of CRAC. The time of the current passage and the specific current density for the adsorbent mass unit were recorded. The voltage drop in the entire cell was measured by voltmeter B7–16 (BELVar Corp, Minsk, Belarus). Used as the source of stable current was potentiostat **-50 (Metering Instrumental Plant MIP, Gomel, Belarus) engaged in galvanostatic mode.

After the regeneration was over, the adsorbent was rinsed in 1000 ml of distilled water to attain the permanent pH value of the rinsing water close to neutral (6.5–8.5). Then the adsorption capacity of CRAC after regeneration had been found by the aforesaid methods. The regeneration degree had been calculated by the values of initial and final capacities using formula:

$$\xi_x^y = \frac{\tilde{A}_x^2}{\tilde{A}_x^1} \cdot 100$$

where:

$\xi_x^y$ the degree of regeneration of adsorbent Y for substance X, %, $\tilde{A}_x^1$ the initial adsorption capacity of the adsorbent by substance X, mg/g (for copper ions—mmole/g), $\tilde{A}_x^2$ the adsorbent substance capacity after regeneration by substance X, mg/g (for copper ions—meq/g).

The following examples illustrate the present invention and its advantages.

EXAMPLE 1.

The dependence of the regeneration degree of CRAC on its properties is given in Table 1. The measurement conditions for the indicated parameters are: CRAC mass—1 g, adsorbed substances are benzene and copper ions, the electrolyte is sodium sulphate of 15 g/dm$^3$ concentration and 9.79 (Ohm$\square$m)$^{-1}$ specific volumetric electric conductivity, the regeneration parameters are 8 V voltage at the cell, the specific current density being 0.01 A/g.

The aforesaid data confirm that the composite regenerable adsorption carbon material with specific volumetric electric conductivity of 1 to 100 (Ohm*$\square$m)$^{-1}$ and with one of the linear dimensions of the particles of one of the porous matrix components being less than 30 micron can be regenerated from adsorbed organic matter (benzene, phenol) up to 95–100%. The use of activated carbon (Table 2) does not provide such a high degree of regeneration. Powdered carbon with the average size of particles of some 50 micron (Calgon 80*325) is of low specific volumetric electric conductivity of the layer and thus the electrochemical processes progresses weakly. Activated carbon with the average size of particles of some 500 micron (Calgon 20×50) at adequately high specific volumetric electric conductivity has a small surface of granule contact with the solution which inflicts diffusion restrictions on the course of the regeneration process and the diffusion of the adsorbed substance molecules from granules. Thus the combination of the required specific volumetric electric conductivity and the linear dimensions of CRAC particles are preferred.

EXAMPLE 2.

Table 3 shows experimental data characterizing the dependence of the regeneration degree on the ratio of specific volumetric electric conductivity of CRAC and electrolyte. The adsorbent mass is 1 g, the adsorbed substances are benzene and phenol, the electrolyte is sodium sulphate, the regeneration parameters are 8 V voltage at cell, 0.01 A/g specific current density, 1 hour regeneration time.

To attain the high degree of regeneration the required condition is that the specific volumetric electric conductivity of CRAC must differ from the specific volumetric electric conductivity of electrolyte by not more than one order of magnitude. If this ratio is not observed, the regeneration degree decreases to 70% and less.

EXAMPLE 3

The experiment on adsorption and regeneration was carried out by the above described methods. The adsorbed substances were phenol, hydroquinone, benzene and chloroform. The regeneration parameters implied the adsorbent with specific volumetric electric conductivity 40.3 (Ohm*$\square$m)$^{-1}$. The composite regenerable adsorption carbon material was a porous matrix made of activated carbon fibers of average fiber length of 1 mm to 5 mm and 1 to 30 micron diameter, the methylene blue adsorption capacity being 300 mg/g, and nonactivated carbon fibers 2 to 30 micron in diameter and average length of 2 to 30 micron. The adsorption surface area was 1100 m$^2$/g)—activated carbon fiber—1 g+nonactivated carbon fiber—0.2 g.

The solution volume in finding the capacity was 400 cm$^3$, and the recirculation rate was 50 cm$^3$/min. The regeneration parameters implied that the adsorbent was engaged as cathode, the specific current density was 0.1 A/g, the electrolyte was 100 g/dm$^3$ sodium sulphate of specific volumetric electric conductivity of 6.87(Ohm*☐m)$^{-1}$. The ratio of specific volumetric electric conductivities of CRAC and electrolyte is equal to 5.9. The voltage drop in the entire cell is 7.2, the time—30–35 min. The results are given in Tables 4, 5, 6 and 7. Various chemicals were adsorbed, namely, phenol, hydroquinone, benzene and chloroform.

The initial concentration of the adsorbed substance in finding the adsorption capacity before regeneration is shown as $C_1$, the final concentration of the adsorbed substance while finding the adsorption capacity before regeneration is denoted as $C_2$ and $*_{init}$ is the adsorption capacity of CRAC for this substance before regeneration.

The initial concentration of the adsorbed substance in finding the adsorption capacity after regeneration is marked as $C_3$, and the final concentration of adsorbed substance in finding the adsorption capacity after regeneration is marked as $C_4$. $*_{fin}$ is the adsorption capacity of CRAC by this substance after regeneration.

This example illustrates that it is possible to attain the high degree of regeneration of CRAC from adsorbed both ionogenic and nonionogenic (polar and nonpolar) organic substances.

EXAMPLE 4.

The adsorbent had a specific volumetric electric conductivity 40.3 (Ohm*☐m)$^{-1}$. Composite regenerable adsorption carbon material in form of a porous matrix made of activated carbon fibers of 1 mm to 5 mm average fiber length and 1 to 30 micron in diameter, and having a methylene blue adsorption capacity of 300 mg/g, and nonactivated carbon fibers 2 to 30 micron in diameter and with average length of 2 to 30 mm. The adsorption surface area made 1100 m$^2$/g)— activated carbon fiber 1 g+nonactivated carbon fiber 0.2 g.

The solution volume in finding the capacity is 400 cm$^3$. The recirculation rate is 50 cm$^3$/min. Sodium chloride and sulphide and potassium carbonate were used as electrolytes to fill the cell in the course of regeneration. The regeneration parameters imply that the adsorbent is engaged as cathode, the specific current density is 0.1 A/g, the voltage drop at the entire cell is 8 V, the time being 40 min.

The results are given in Table 8. The symbols in the table are similar to those described in example 3.

This example illustrates the results obtained in using various electrolyte solutions. The results given in Table 7 show that the regeneration degree actually does not vary when CRAC porous cell is filled with sodium chloride, sulphate and potassium carbonate water solutions, if the specific volumetric electric conductivity of CRAC is not more than by one order of magnitude higher than the specific volumetric electric conductivity of electrolyte.

The experimental data obtained in regeneration of the claimed composite materials from benzene, chloroform and hydroquinone are identical to data given in this example.

EXAMPLE 5.

CRAC (e.g. activated carbon fiber—1 g+nonactivated carbon fiber 0.2 g with specific volumetric electric conductivity of 40.3 (Ohm*☐m)$^{-1}$) had been subjected to adsorption with subsequent regeneration. The composite regenerable adsorption carbon material is a porous matrix made of activated carbon fibers with the average fiber length of 1 mm to 5 mm and 1 to 30 micron diameter, the methylene blue adsorption capacity being 300 mg/g, and nonactivated carbon fibers of 2 to 30 micron in diameter and average length of 2 to 30 mm. The adsorption surface area made 1100 m$^2$/g.

The electrolyte is sodium sulphate of 100 g/dm$^3$ and specific volumetric electric conductivity 6.87 (Ohm*☐m)$^{-1}$. The adsorbed substances are phenol and benzene. The volume of solution in finding the capacity is 400 cm$^3$. The recirculation rate is 50 cm$^3$/min. The regeneration parameters implied the adsorbent being engaged as cathode, the specific current density for the adsorbent (CRAC) mass unit was varied.

The ratio of the specific volumetric electric conductivities of CRAC and electrolyte is equal to 5.9. The voltage drop in the entire cell is 8 V, the time being 30–35 min. The results are given in Table 9.

The given experimental data confirm that when electric current is passed at specific density of at least 0.01 A/g the degree of CRAC regeneration from phenol increases and complete (100%) regeneration is attained for benzene. With current density reduced to lower than 0.01 A/g the regeneration degree becomes lower.

EXAMPLE 6.

Adsorbent with specific volumetric electric conductivity of 40.3 (Ohm*☐m)$^{-1}$—activated carbon fiber 1 g+nonactivated carbon fiber 0.2 g was used.

The composite regenerable adsorption carbon material was a porous matrix made of activated carbon fibers of average fiber length 1 mm to 5 mm and 1 to 30 micron in diameter, with the methylene blue adsorption capacity being 300 mg/g, and nonactivated carbon fibers 2 to 30 micron in diameter and average length 2 to 30 mm. The adsorption surface area made 1100 m$^2$/g.

The solution volume in finding the capacity was 400 cm$^3$. The recirculation rate was 50 cm$^3$/min. The regeneration parameters implied the voltage drop in the entire cell being 7.2 V, the time being 30 min. To fill the cell in the course of regeneration electrolytes were used i.e. sodium sulphate of 100 g/dm$^3$ concentration and specific volumetric electric conductivity of 6.87 (Ohm*☐m)$^{-1}$. The regeneration parameters implied that the adsorbent was engaged as cathode in one cycle and as anode in the second cycle, the specific current density being 0.1 A/g.

The ratio of specific volumetric electric conductivities of CRAC and electrolyte is equal to 5.9. The results are given in Tables 10 and 11.

The symbols in the Tables are similar to those described in Example 3. The example shows that the adsorbent is regenerated both in cathode and anode regeneration process.

EXAMPLE 7

The experimental scheme is similar to that described in Example 1. Adsorbed substances are phenol, benzene and chloroform. Regeneration parameters are CRAC with specific volumetric electric conductivity 53.5 (Ohm*☐m)$^{-1}$— activated carbon fiber 1 g+nonactivated carbon fiber (0.2 g).

The composite regenerable adsorption carbon material is a porous matrix made of activated carbon fibers of average fiber length 1 mm to 5 mm and 1 to 30 micron in diameter, the methylene blue adsorption capacity being 300 mg/g, and nonactivated carbon fibers 2 to 30 micron in diameter and of average length 2 to 30 mm. The adsorption surface area made 1100 m$^2$/g.

The volume of solution in filling the capacity was 500 cm$^3$. The recirculation rate was 100 cm$^3$/min. The electrolyte was 100 g/dm$^3$ sodium sulphate of specific volumetric electric conductivity 6.87 (Ohm*☐m)$^{-1}$.

The ratio of the specific volumetric electric conductivities of CRAC and electrolyte is equal to 7.8. The regeneration parameters imply that the adsorbent is engaged as cathode, the current density being 0.1 A/g, the voltage drop in the entire cell is 7.3 V, time is 35 min. 10 adsorption & regeneration cycles had been carried out. The results of cycles 1, 2, 3, 5 and 10 are given in Table 12.

The example shows that after multiple regeneration cycles the adsorption capacity of CRAC and the regeneration degree are retained.

EXAMPLE 8.

Finding the oxidation & reduction capacity of CRAC.

To find the above, the platinum Ox-Red electrode was initially calibrated in $K_3[Fe(CN)_6]$ and $K_4[Fe(CN)_6]$ system by standard methods described in [Physical Chemistry, edited by B. P. Nikolsky//Chemistry, L., 1987]. Three 1 g strands were taken of activated carbon fiber with 350 mg/g methylene blue capacity and specific volumetric electric conductivity 53.5 $(Ohm*\square m)^{-1}$ with average fiber length of 1 mm to 5 mm and diameter of 1 to 30 micron. The adsorption surface area made 1100 $m^2/g$.

Two specimens were placed into the throughput electrode and subjected to 2 regeneration cycles. Each cycle implied the supply of successively positive and negative 9 V voltage at 100 mA current (with 0.1 A/g specific current density) for 30 min. Used as electrolyte was 100 g/dm³ sodium sulphate solution with specific volumetric electric conductivity 6.87 $(Ohm*\square m)^-$. The ratio of the specific volumetric electric conductivities of CRAC and electrolyte was equal to 7.8.

Specimen No. 1 was processed by the cathode-anode-cathode-anode scheme and No. 2, respectively, by the anode-cathode-anode-cathode scheme. Specimen No. 3 had got no electrochemical treatment. The specimens were washed in distilled water to pH□7. Then the oxidation & reduction capacity of the processed and unprocessed specimens was found by the following methods. 0.2 g of each specimen was placed in 40 ml of solution with concentration $C(K_3[Fe(CN)_6]=C(K_4[Fe(CN)_6]=0.005$ mole/dm³. Ox-Red potential of the platinum electrode was measured in the solution to $(E_1)$ and after seasoning the sample in the solution for an hour $(E_2)$. The oxidation & reduction capacity had been calculated by the known-formula given in [Ionites in chemical technology//edited by B. P. Nikolsky and P. G. Romankov, L., Chemistry, 1982]. The values of oxidation & reduction capacities are given in Table 13.

Thus given data confirm that in the course of regeneration the oxidation & reduction capacity of CRAC (which characterizes the adsorbent's capacity to adsorb active chlorine) is not decreased.

Adsorption of active chlorine. For the adsorption of active chlorine two ACF samples of 350 mg/g methylene blue capacity and specific volumetric electric conductivity 53.5 $(Ohm*\square m)^{-1}$ with average fiber length of 1 mm to 5 mm and diameter of 1 to 30 micron were used. The adsorption surface area made 1100 $m^2/g$.

The mass of each 1.5 g specimen was placed into the cell (see FIG. 4). The electrolyte used was 100 g/dm³sodium sulphate solution with specific volumetric electric conductivity 6.87 $(Ohm*\square m)^{-1}$. The ratio of specific volumetric electric conductivities of CRAC and electrolyte was equal to 7.8.

0.15 A current (of 0.1 A/g specific current density) had been passed through the cell for 1 hour. The voltage drop made 7.8 V. Cathode was specimen No. 1, anode—specimen No. 2. The electrolyte was 100 g/dm³ sodium sulphate solution. Similarly two other specimens underwent two cycles of similar treatment: specimen No. 3 as cathode, specimen No. 4 as anode.

The specimens were placed into a column 20 mm in diameter and 25 mm high and washed with distilled water to pH□7. The peristaltic pump was used to pump through the tap water with 0.8 mg/dm³ initial concentration of chlorine. The active chlorine was identified iodometrically by the known methods of [Taube P. R., Baranova A. G.//Practicum in water chemistry, M., Higher School, 1971]. The minimum water flow had been found wherein the active chlorine concentration at the outlet had become over 0.3 mg/dm³ (chlorine rush-through). The results are summarized in Table 14.

The example shows that the regeneration process increases the adsorption capacity as to the active chlorine.

EXAMPLE 9.

The experimental scheme is similar to Example 1. The mass of the specimen of activated carbon fiber with specific volumetric electric conductivity 53.5 $(Ohm*\square m)^{-1}$ is equal to 1.1 g, with 1 mm to 5 mm average fiber length and 1 to 30 micron diameter. The adsorption surface area made 1100 $m^2/g$.

The electrolyte was 100 g/dm³ sodium sulphate solution with specific volumetric electric conductivity 6.87 $(Ohm*\square m)^{-1}$. The ratio of specific volumetric electric conductivities of CRAC and electrolyte was equal to 7.8.

The initial copper capacity of the specimen was 0.16 mmole/g. Initially the adsorbent was subjected to cathode polarization.

The current was 0.1 A (at 0.09 A/g specific current density), the time was 40 min, the voltage drop made 7.8 V. After washing in distilled water the copper capacity was found to be 0.02 mmole/g. After a similar process wherein the adsorbent operated as anode (current 0.1 A, time 40 min, voltage drop 7.8 V, specific current density 0.09 A/g) the copper capacity made 0.15 mmole/g. Thus, with due account of the accuracy of finding the adsorption capacity for copper, the regeneration degree for copper made 0% in the cathode process and 100% in the anode one.

The above described process had been repeated once more with the same specimen and the same results (100% regeneration degree for copper in the anode process).

ACF and ion-exchange fiber mixture.

The experimental scheme is similar to that described in Example 1. The mixture with specific volumetric electric conductivity 17.7 $(Ohm*\square m)^{-1}$ of 1 g activated carbon fiber of 200 mg/g methylene blue adsorption capacity and 0.6 g ion-exchange fiber was placed into the adsorption regenerable electrode (FIG.2). The average ACF fiber length was 1 mm to 5 mm of 1 to 30 micron diameter. The ACF adsorption surface area made 1100$m^2/g$.

The electrolyte was 100 g/dm³ sodium sulphate solution with specific volumetric electric conductivity 6.87 $(Ohm*\square m)^{-1}$. The ratio of specific volumetric electric conductivities of CRAC and electrolyte was equal to 5.5.

The adsorption capacity of the composite material for copper made 0.35 mmole/g. Initially the adsorbent was cathode polarized. The current was 0.15 A (specific current density 0.093 A/g), the time was 40 min, the voltage drop made 8.4 V. The capacity for copper was found after washing in distilled water and made 0.02 mmole/g. After the similar process wherein the adsorbent acted as anode (current 0.1 A, time 40 min, voltage drop 7.8 V, specific current density 0.093 A/g) the capacity for copper made 0.15 mmole/g. Thus, with due account of the accuracy of finding the adsorption capacity for copper, the regeneration degree for copper made 0% in cathode process and 100% in anode process.

The above described process had been repeated once more with the same specimen and the same results (100% regeneration degree for copper in the anode process).

The above described example illustrates the complete regeneration for the ions of heavy metals by the ACF and ACF & ion-exchange fiber based CRAC in the anode process.

EXAMPLE 10

Experiment on methylene blue decomposition

The experimental scheme is similar to Example 1. The activated carbon fiber of 1 g mass was placed into the adsorption regenerable electrode shown in FIG. 2. The ACF was of specific volumetric electric conductivity 53.5 $(Ohm*\Box m)^{-1}$, the average fiber length being 1 mm to 5 mm of 1 to 30 micron in diameter. The adsorption surface area made 1100 $m^2/g$.

The electrolyte was 100 $g/dm^3$ sodium sulphate solution with specific volumetric electric conductivity 6.87 $(Ohm*\Box m)^{-1}$. The ratio of specific volumetric electric conductivities of CRAC and electrolyte was equal to 7.8.

Experimental scheme

Passed through the regenerable adsorption electrode were 400 ml of the same MB solution and the depletion of the colour in the solution was found, then the electrode was placed into the cell in couple with the inert graphite electrode. In the undertaken regeneration the adsorbent acted as cathode (0.25 A, specific current density 0.25 A/g, 8.4 V, 20 min) and anode (0.25 A, specific current density 0.25 A/g, 7.2 V, 20 min). Thereafter the electrode had been washed in 200 ml distilled water. MB was not found in the wash waste. The results are given in Table 15.

Thus the initial capacity of the activated carbon fiber by methylene blue in single adsorption made 440 $mg/dm^3$. After the above described process was undertaken it increased to 590 $mg/dm^3$. The experimental data obtained in regeneration of claimed CRAC are identical to data given in this example.

The above described example shows that in the course of regeneration the substance previously adsorbed on CRAC is not only desorbed by also decomposed (oxidized, destructed).

EXAMPLE 11

Placed into the adsorption regenerable electrode (FIG. 2) was CRAC of 1 g of activated carbon fiber and 0.2 g of nonactivated carbon fiber with specific volumetric electric conductivity 45.5 $(Ohm*\Box m)^{-1}$ equal to 1.1 g.

The composite regenerable adsorption carbon material is a porous matrix made of activated carbon fibers of average fiber length of 1 mm to 5 mm and 1 to 30 micron in diameter (the methylene blue adsorption capacity being 300 mg/g) and nonactivated carbon fibers 2 to 30 micron in diameter and average length of 20 to 30 mm. The adsorption surface area made 1100 $m^2/g$.

The electrolyte was 50 $g/dm^3$ sodium chloride solution with specific volumetric electric conductivity 6.72 $(Ohm*\Box m)^{-1}$. The ratio of specific volumetric electric conductivities of CRAC and electrolyte was equal to 6.8.

Passed through the cell was *E. Coli* suspension of 80 kl/$dm^3$ concentration at the 5 ml/min flowrate. Each litre of thus passed solution was analyzed. The experiment was continued until the intestinal bacteria rushed through at the outlet (Coli-index>3).

Then electric current was passed through the cell for 30 min. The adsorbent was engaged as anode, the specific current density being 0.05 A/g. After the regeneration was over no live *E-coli* cells were found in the washing water. Then the experiment was repeated with *E-Coli* suspension passage. The results are given in Table 16.

The example shows that in the course of anode process the adsorbent is sterilized.

TABLE 1

| Composition of the composite adsorbent carbon regenerable material in mass percentage | Adsorbed substance | Specific volumetric electric conductivity of adsorbent, $(Ohm \cdot m)^{-1}$ | Regeneration degree, % | Regeneration time, min |
|---|---|---|---|---|
| ACF* | Benzene phenol | 1.05 | 97% 96% | 60 |
| ACF 99% mass. CF** 1% mass. | benzene phneol | 2.03 | 98% 96% | 50 |
| ACF 97% mass. CF** 3% mass. | benzene phenol | 5.61 | 100% 97% | 40 |
| ACF 90% mass. CF** 10% mass. | benzene phenol | 9.79 | 100% 97% | 30 |
| ACF 85% mass. CF** 15% mass. | benzene phenol | 16.8 | 100% 97% | 30 |
| ACF 65% mass. CF** 35% mass. | benzene phenol | 50.8 | 100% 97% | 40 |
| ACF 30% mass. CF** 70% mass. | benzene phenol | 99.6 | 98% 95.5% | 50 |
| ACF 50% mass. Ion-exchange fiber 50% mass.*** | copper ions | 17.7 | 100% | 60 |
| ACF 10% mass. AC <<Calgon 20*50>> 90% mass.+ | benzene phenol | 53.5 | 96% 96% | 60 |
| ACF 10% mass. AC <<Calgon 80*325>> 90% mass.++ | benzene phenol | 46.1 | 98% 96% | 60 |
| CF 10%****. *C <<Calgon 20*50>> 90% mass.+++ | benzene phenol | 62.8 | 98% 95% | 60 |

*composite regenerable adsorption carbon material in form of a porous matrix made of activated carbon fibers of various length, the average length of fibers being 1 to 5 mm. The fiber diameter is 6 to 10 micron. The methylene blue adsorption capacity made 330 mg/g. The adsorption surface area made 1100 $m^2/g$.

**composite regenerable adsorption carbon material in form of a porous matrix made of activated carbon fibers of average fiber length 1 mm to 5 mm and diameter of 1 to 30 micron (the methylene blue adsorption capacity being 300 mg/g) and nonactivated carbon fibers 2 to 30 micron in diameter and of 2 to 20 mm average length. The adsorption surface area made 1100 $m^2/g$.

***composite regenerable adsorption carbon material in form of a porous matrix made of activated carbon fibers of 1 mm to 5 mm average fiber length and 1 to 10 micron in diameter (the methylene blue adsorption capacity being 300 mg/g and the adsorption surface area made 1100 $m^2/g$ and ion-exchange fibers 1 to 20 micron in diameter and of 1 meq/g exchange capacity.

+composite regenerable adsorption carbon material in form of a porous matrix made of activated carbon fibers of 10 mm to 20 mm average fiber length and 1 to 10 micron in diameter (the methylene blue adsorption capacity being 300 mg/g and the adsorption surface area made 1100 $m^2/g$) and granulated activated carbon of average 50 micron diameter of particles, the methylene blue adsorption capacity being 200 mg/g and the adsorption surface area made 1000 mg/g.

++composite regenerable adsorption carbon material in form of a porous matrix made of activated carbon fibers of average 10 mm to 20 mm fiber length and 1 to 10 micron in diameter (the methylene blue adsorption capacity being 300 mg/g and the adsorption surface area made 1100 $m^2/g$) and granulated activated carbon of 500 micron average diameter of granules, 150 mg/g methylene adsorption capacity and 900 $m^2/g$ adsorption surface area.

+++composite regenerable adsorption carbon material in form of a porous matrix made of nonactivated carbon fibers of 2 mm to 30 mm fiber length and 2 to 30 micron in diameter and granulated activated carbon of 500 micron average diameter of granules, 150 mg/g methylene blue adsorption and 900 $m^2/g$ adsorption surface area.

TABLE 2

| Composition (weight per cent) | Average size of particles | Adsorbed substances | Specific volumetric electric conductivity of adsorbent (*hm☐m)$^{-1}$) | Regeneration degree (%) | Regeneration time (min) |
|---|---|---|---|---|---|
| Powdered activated carbon (PAC) Calgon 80*325 | 50 micron | Benzene Phenol | 0.547 | 14 12 | 180 |
| Granulated activated carbon (GAC) Calgon 20*50 | 500 micron | Benzene Phenol | 10.6 | 29 26 | 180 |

TABLE 3

| Composition of the composite adsorption carbon regenerable material (weight %) | Specific volumetric electric conductivity of adsorbent (*hm☐m)$^{-1}$ | Sodium sulphate solution conc g/dm$^3$ | Specific volumetric electric conductivity of electrolyte solution, (*hm☐m)$^{-1}$ | Ratio of specific volumetric electric conductivity of adsorbent and electrolyte solution | Adsorbed substance | Regeneration degree (%) |
|---|---|---|---|---|---|---|
| ACF | 1.05 | 63.5 | 5.21 | 4.96 | benzene phenol | 98% 97% |
| ACF | 1.05 | 2.56 | 0.21 | 0.20 | benzene phenol | 97% 93% |
| ACF 85% mass. CF 15% mass. | 50.15 | 100 | 6.87 | 7.3 | benzene phenol | 97% 96% |
| ACF 85% mass. CF 15% mass. | 50.15 | 150 | 8.86 | 5.7 | benzene phenol | 99% 97% |
| *CF 50% mass. ion-exchange fiber 50% mass | 50.1 | 100 | 6.87 | 7.3 | copper ions | 100% |
| *CF 50% mass. ion-exchange fiber 50% mass | 50.1 | 150 | 8.86 | 5.7 | copper ions | 100% |
| *CF −10% mass. *C <<Calgon 20*50>> | 53.5 | 100 | 6.87 | 7.8 | benzene phenol | 96% 96% |
| *CF 10% mass. *C <<Calgon 20*50>> | 53.5 | 150 | 8.86 | 6 | benzene phenol | 100% 96% |
| *CF 10% mass. *C <<Calgon 80*325>> | 46.1 | 100 | 6.87 | 6.7 | benzene phenol | 99% 97% |
| *CF 10% mass. *C <<Calgon 80*325>> | 46.1 | 150 | 8.86 | 5.4 | benzene phenol | 99% 97% |
| *CF 85% mass. CF 15% mass. | 50.15 | 2.56 | 0.21 | 239 | benzene phenol | 70% |

TABLE 4

| | Substance-phenol | | | | | | |
|---|---|---|---|---|---|---|---|
| Regeneration cycle | *$_1$ mg/dm$^3$ | *$_2$ mg/dm$^3$ | *i$_{nit}$ mg/g | *$_3$ mg/dm$^3$ | *$_4$ mg/dm$^3$ | *$_{fin}$ mg/g | Regeneration degree, % |
| 1 | 800 | 240 | 224 | 800 | 292 | 203 | 95 |
| 2 | 800 | 292 | 203 | 800 | 293 | 203 | 100 |
| 3 | 800 | 293 | 203 | 800 | 291 | 204 | 100 |

TABLE 5

Substance-hydroquinone

| Regeneration cycle | $*_1$ mg/dm$^3$ | $*_2$ mg/dm$^3$ | $*_{init}$ mg/g | $*_3$ mg/dm$^3$ | $*_4$ mg/dm$^3$ | $*_{ifin}$ mg/g | Regeneration degree, % |
|---|---|---|---|---|---|---|---|
| 1 | 200 | 32.5 | 67 | 200 | 60 | 56 | 95 |
| 2 | 200 | 60 | 56 | 200 | 62 | 55.2 | 99 |
| 3 | 200 | 62 | 55.2 | 200 | 61 | 55.6 | 101 |

TABLE 6

Substance-benzene

| Regeneration cycle | $*_1$ mg/dm$^3$ | $*_2$ mg/dm$^3$ | $*_{init}$ mg/g | $*_3$ mg/dm$^3$ | $*_4$ mg/dm$^3$ | $*_{fin}$ mg/g | Regeneration degree, % |
|---|---|---|---|---|---|---|---|
| 1 | 1450 | 650 | 320 | 1450 | 660 | 316 | 99 |
| 2 | 1450 | 660 | 316 | 1450 | 660 | 316 | 100 |

TABLE 7

Substance-chloroform

| Regeneration cycle | $*_1$ mg/dm$^3$ | $*_2$ mg/dm$^3$ | $*_{init}$ mg/g | $*_3$ mg/dm$^3$ | $*_4$ mg/dm$^3$ | $*_{fin}$ mg/g | Regeneration degree, % |
|---|---|---|---|---|---|---|---|
| 1 | 300 | 100 | 80 | 300 | 108 | 77 | 100 |
| 2 | 300 | 108 | 77 | 300 | 109 | 76.4 | 100 |

TABLE 8

| Electrolyte | Specific volumetric electric conductivity of electrolyte solution, $(*hm*m)^{-1}$ | Ratio of specific volumetric electric conductivities of CRAC and electrolyte solution | Adsorbed substance | Regeneration degree, % |
|---|---|---|---|---|
| Sodium carbonate 50 g/dm$^3$ | 4.51 | 8.9 | benzene | 97 |
|  |  |  | phenol | 95 |
| Sodium sulphate 50 g/dm$^3$ | 6.72 | 6.0 | benzene | 96 |
|  |  |  | phenol | 96 |
| Sodium chloride 20 g/dm$^3$ | 4.09 | 9.8 | benzene | 96 |
|  |  |  | phenol | 95 |

TABLE 9.

| Adsorbed substance | Current density for CRAC mass unit, A/g | Regeneration degree, % |
|---|---|---|
| benzene | 0.005 | 70 |
| phenol |  | 69 |
| benzene | 0.01 | 99 |
| phenol |  | 95 |
| benzene | 0.05 | 100 |
| phenol |  | 96 |
| benzene | 0.1 | 99 |
| phenol |  | 96 |
| benzene | 1 | 100 |
| phenol |  | 97 |

TABLE 10

Substance-benzene

| Regeneration cycle | $*_1$ mg/dm³ | $*_2$ mg/dm³ | $*_{init}$ mg/g | $*_3$ mg/dm³ | $*_4$ mg/dm³ | $*_{fin}$ mg/g | Regeneration degree, % |
|---|---|---|---|---|---|---|---|
| 1st cycle - cathode | 1450 | 650 | 320 | 1450 | 650 | 320 | 100 |
| 2ud cycle - cathode | 1450 | 650 | 320 | 1450 | 660 | 316 | 99 |
| 1st cycle - anode | 1450 | 725 | 290 | 1450 | 747 | 281 | 97 |
| 2ud cycle - anode | 1450 | 660 | 316 | 1450 | 660 | 316 | 100 |

TABLE 11

Substance-chloroform

| Regeneration cycle | $*_1$ mg/dm³ | $*_2$ mg/dm³ | $*_{init}$ mg/g | $*_3$ mg/dm³ | $*_4$ mg/dm³ | $*_{fin}$ mg/g | Regeneration degree, % |
|---|---|---|---|---|---|---|---|
| 1st cycle - cathode | 800 | 587 | 85 | 800 | 585 | 86 | 101 |
| 2ud cycle - cathode | 800 | 585 | 86 | 800 | 590 | 84 | 98 |
| 1st cycle - anode | 800 | 605 | 78 | 800 | 607 | 77 | 99 |
| 2ud cycle - anode | 800 | 607 | 77 | 800 | 612 | 75 | 100 |

TABLE 12

| Regeneration cycle | Adsorbed substance | $*_1$ mg/dm³ | $*_2$ mg/dm³ | $*_{init}$ mg/g | $*_3$ mg/dm³ | $*_4$ mg/dm³ | $*_{fin}$ mg/g | Regeneration degree, % |
|---|---|---|---|---|---|---|---|---|
| 1 | phenol | 750 | 540 | 210 | 750 | 545 | 205 | 98 |
|   | benzene | 600 | 393 | 207 | 600 | 393 | 207 | 100 |
|   | chloroform | 300 | 224 | 76 | 300 | 225 | 75 | 99 |
| 2 | phenol | 750 | 541 | 209 | 750 | 540 | 210 | 100 |
|   | benzene | 600 | 395 | 205 | 600 | 395 | 205 | 100 |
|   | chloroform | 300 | 226 | 74 | 300 | 227 | 73 | 99 |
| 3 | phenol | 750 | 548 | 202 | 750 | 549 | 201 | 100 |
|   | benzene | 600 | 389 | 211 | 600 | 390 | 210 | 100 |
|   | chloroform | 300 | 223 | 77 | 300 | 223 | 77 | 100 |
| 5 | phenol | 750 | 540 | 210 | 750 | 545 | 205 | 98 |
|   | benzene | 600 | 390 | 210 | 600 | 389 | 211 | 100 |
|   | chloroform | 300 | 225 | 75 | 300 | 225 | 75 | 100 |
| 10 | phenol | 750 | 537 | 213 | 750 | 541 | 209 | 98 |
|   | benzene | 600 | 390 | 210 | 600 | 390 | 210 | 100 |
|   | chloroform | 300 | 225 | 75 | 300 | 227 | 73 | 98 |

TABLE 13.

| Specimen * | □, meg/g |
|---|---|
| 1 | 8.2 |
| 2 | -7.5 |
| 3 | -3.5 |

TABLE 14.

| Spe*imen * | Minimum water flowrate at which active chlorine pushes through the column, ml/min |
|---|---|
| 1 | 600 |
| 2 | 400 |
| 3 | 450 |
| 4 | 800 |

TABLE 15.

| Experiment * | Electrolysis mode | MB input concentration, mg/dm$^3$ | MB output concentration, mg/dm$^3$ |
|---|---|---|---|
| 1 | No electrolysis undertaken | 1500 | 400 |
| 2 | No electrolysis undertaken | 400 | 110 |
| 3 | No electrolysis undertaken | 110 | 25 |

TABLE 16.

| | Coli-index at cell outlet | | | | |
|---|---|---|---|---|---|
| | 1 st liter | 2 st liter | 3 st liter | 4 st liter | 5 st liter |
| New cell | <3 | <3 | <3 | 3 | 5 |
| Cell after regeneration | <3 | <3 | <3 | <3 | 4 |

What is claimed is:

1. A method for regeneration of a composite porous matrix comprised of a regenerable adsorption carbon material (CRAC) which has adsorbed therein substances to be separated therefrom, comprising permeating said porous matrix with an electrolytic solution, and applying an electric current to said electrolytic solution, wherein the specific volumetric electric conductivity of said porous matrix differs from the specific volumetric electric conductivity of the electrolytic solution by not more than one order of magnitude, and wherein electric current is passed through the surface of the carbon-electrolyte solution interface at a specific current density of at least 0.01 ampere per gram of adsorption carbon.

2. The method of claim 1 wherein said composite porous matrix has a specific volume electric conductivity of 1 to 100 (Ohm.m)$^1$.

3. The method of claim 2 wherein the specific volumetric electric conductivity of said adsorption carbon material is from 0.2 to 5 times the specific volumetric electric conductivity of said electrolytic solution.

4. The method of claim 2 wherein the specific current density of said electric current is at least 0.05 ampere per gram of said composite adsorption carbon material.

5. The method of claim 2 wherein said electrolytic solution is pumped through said composite porous matrix in the course of the regeneration process in order to remove desorbed impurities.

6. The method of claim 5 wherein said electrolytic solution is substantially continuously pumped through said composite porous matrix in the course of the regeneration process.

7. The method of claim 2 wherein the adsorbed substances that are removed from said composite porous matrix during regeneration are selected from the group consisting of nonpolar organic matter, polar organic matter, ionic organic matter, biological organic matter, and ions of heavy metals.

8. The method of claim 1 wherein the procedure restores the ability of said composite adsorption carbon material to adsorb active chlorine.

9. The method of claim 1 wherein the electric current passed through the composite porous matrix is a direct cathodic or anodic current.

10. The method of claim 9 wherein the passage of said electric current takes place in at least two stages with changing polarity.

11. The method of claim 1 wherein said carbon material comprises a porous matrix of activated carbon fibers which have an average fiber length of at least about 1 mm, and which have diameters of 1–30 microns.

* * * * *